US011008202B2

(12) United States Patent
Macalus et al.

(10) Patent No.: US 11,008,202 B2
(45) Date of Patent: May 18, 2021

(54) CART TRANSPORT VESSEL

(71) Applicant: Target Brands, Inc., Minneapolis, MN (US)

(72) Inventors: Samuel Macalus, Plymouth, MN (US); Dan Hawkins, Minneapolis, MN (US); Matthew Arcaro, Maple Grove, MN (US); Jamison Harrell-Latham, Minneapolis, MN (US); Michiel van de Ven, West Olive, MI (US); L. Klaus Preidt, Grand Rapids, MI (US); Karl Chapel, Grand Haven, MI (US); Bob Chapel, Grand Haven, MI (US); Jason Sanders, Cumming, GA (US)

(73) Assignee: Target Brands, Inc., Minneapolis, MN (US)

(*) Notice: Subject to any disclaimer, the term of this patent is extended or adjusted under 35 U.S.C. 154(b) by 164 days.

(21) Appl. No.: 16/398,617

(22) Filed: Apr. 30, 2019

(65) Prior Publication Data

US 2020/0346908 A1 Nov. 5, 2020

(51) Int. Cl.

| | |
|---|---|
| ***B60P 1/43*** | (2006.01) |
| ***B66F 9/07*** | (2006.01) |
| ***B65D 19/38*** | (2006.01) |
| ***B65D 19/06*** | (2006.01) |

(52) U.S. Cl.

CPC ................ *B66F 9/07* (2013.01); *B65D 19/06* (2013.01); *B65D 19/38* (2013.01)

(58) Field of Classification Search

CPC ......... B65D 88/542; B60P 1/433; B66F 9/127

See application file for complete search history.

(56) References Cited

U.S. PATENT DOCUMENTS 3,521,775 A * 7/1970 Vermette .................. B66F 7/04 414/495
3,861,554 A 1/1975 Legg et al.
4,020,957 A * 5/1977 Wren ........................ B60P 3/07 414/537
4,045,043 A 8/1977 Fourrey
4,295,431 A 10/1981 Stavlo (Continued)

FOREIGN PATENT DOCUMENTS

GB 2443623 A 5/2008
GB 2443709 A 5/2008
JP 2002154543 A 5/2002

*Primary Examiner* — Jonathan Snelting

(74) *Attorney, Agent, or Firm* — Leanne Taveggia Farrell; Westman, Champlin & Koehler, P.A.

(57) ABSTRACT

A cart transport vessel includes a fixed platform configured to hold at least one cart, a fixed ramp located adjacent to the fixed platform and a foldable ramp extension that is rotatably coupled to a front end of the fixed ramp. In an opened configuration, a first side of the foldable ramp extension faces upwardly and is in planar alignment with a planar top surface of the fixed ramp and an opposing second side of the foldable extension faces downwardly. In a closed configuration, the foldable ramp extension is rotated so that the first side of the foldable ramp extension faces downwardly and is in contact with the planar top surface of the ramp section and the opposing second side of the foldable ramp extension faces upwardly to provide a flat operator workspace area that is configured to be stood on by an operator.

17 Claims, 14 Drawing Sheets

(56) References Cited

U.S. PATENT DOCUMENTS

| | | | | |
|---|---|---|---|---|
| 6,186,734 | B1 * | 2/2001 | Maurer | B60P 1/43<br>14/71.1 |
| 6,402,167 | B1 | 6/2002 | Calleja | |
| 6,811,163 | B1 | 11/2004 | Gurule et al. | |
| 7,150,487 | B2 * | 12/2006 | Devitt | B60P 1/433<br>296/61 |
| 7,798,352 | B2 | 9/2010 | Naruishi et al. | |
| 8,257,008 | B2 * | 9/2012 | Ellingson | B66F 9/127<br>414/608 |
| 8,881,898 | B2 | 11/2014 | DeForest | |
| 8,931,420 | B2 | 1/2015 | Larson et al. | |
| 2005/0220595 | A1 * | 10/2005 | Hull | B60P 1/433<br>414/537 |
| 2014/0271072 | A1 * | 9/2014 | Friesen | B60P 1/438<br>414/537 |

* cited by examiner

CART TRANSPORT VESSEL

BACKGROUND

Retailers participate in supply chain management and logistics to control product quality, inventory levels, timing and expenses. Retail companies may have a variety of different brick and mortar store formats including large format stores and small format stores and need to manage their supply chain and logistics in accordance with the different types. The supply chain for a retailer includes all of the contributors involved in getting merchandise into the hands of customers and guests. Logistics is the moving and storing of goods including shipping and warehousing.

The discussion above is merely provided for general background information and is not intended to be used as an aid in determining the scope of the claimed subject matter.

SUMMARY

A cart transport vessel includes a cart holding section configured to hold at least one cart and is defined by a right side, a left side, a front, a back and a fixed platform having a planar top surface. A ramp section is defined by a fixed ramp including a front end, a back end that is adjacent the front of the cart holding section and a planar top surface. The planar top surface of the fixed ramp is oriented at a downward angle from the planar top surface of the fixed platform. A foldable ramp extension is rotatably coupled to the front end of the fixed ramp. The foldable ramp extension includes a first side, an opposing second side and a third side that connects the first side to the opposing second side. When the cart transport vessel is in an opened configuration, the first side of the foldable ramp extension faces upwardly and is in planar alignment with the planar top surface of the fixed ramp and the second opposing side faces downwardly. When the cart transport vessel is in a closed configuration, the first side of the foldable ramp extension faces downwardly and is in contact with the planar top surface of the fixed ramp and the second opposing side faces upwardly to provide a flat operator workspace area that is configured to be stood on by an operator.

A cart transport vessel includes a fixed platform configured to hold at least one cart, a fixed ramp located adjacent to the fixed platform and a foldable ramp extension that is rotatably coupled to a front end of the fixed ramp. In an opened configuration, a first side of the foldable ramp extension faces upwardly and is in planar alignment with a planar top surface of the fixed ramp and an opposing second side of the foldable extension faces downwardly. In a closed configuration, the foldable ramp extension is rotated so that the first side of the foldable ramp extension faces downwardly and is in contact with the planar top surface of the ramp section and the opposing second side of the foldable ramp extension faces upwardly to provide a flat operator workspace area that is configured to be stood on by an operator.

A method of transporting carts in a warehouse includes loading at least one cart onto a cart transport vessel in an opened configuration by rolling the cart over a first side of a foldable extension, rolling the cart over a planar top surface of a fixed ramp and placing the cart on a planar top surface of a fixed platform. The foldable extension is rotatably coupled to a front end of the fixed ramp and the fixed platform is coupled to a back end of the fixed ramp. The cart transport vessel is placed into a closed configuration by rotating the foldable extension so that the first side is in contact with the planar top surface of the fixed ramp and an opposing second side of the foldable extension faces upwardly to provide a flat operator workspace area that is configured to be stood on by an operator. At least one fork of a work machine is inserted into at least one forklift receiving slot located below the fixed ramp and the fixed platform of the cart transport vessel to move the cart transport vessel and therefore the at least one cart.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

A retail store warehouse is a commercial building that stores retail goods before further distribution. A retail store warehouse usually has loading docks to load and unload inventory from trucks, cranes and forklifts for moving inventory, and pallets and storage racks for storing the inventory. A retailer predominantly runs a piece-pick operation where order selection processes are picked and handled in individual units and placed in another container or inventory cart before distribution from the warehouse. This may mean order picking retail goods and items from the warehouse that are in low quantity into stocking carts that are then transported directly to a store. At the store, the stocking carts are wheeled off of the truck trailer, moved into the aisles of the store floor and retail goods and items are placed from the stocking carts onto retail display units.

Warehousing efficiencies and safety may be lost in retail warehouse processing systems where multiple touches of the retail goods or non-ergonomic moves are needed to get the retail goods to their storage location, to get the retail goods from their stored location to the sales floor or to get the retail goods from their stored location into the hands of the customers. As discussed above and in some instances, retail goods and items in the warehouse are picked directly into stocking carts that will eventually be processed in the store. To make this task more efficient, embodiments of a cart transport vessel are provided that are coupleable to a work machine or order picker and are capable of holding or cradling one or more stocking carts. The work machine moves the cart transport vessel, which is holding the one or more stocking carts, from place to place around the floor of the warehouse as well as provides features for ergonomically and safely moving the cart transport vessel vertically into the air from the floor so that retail goods and items may be picked directly from a rack into the one or more stocking carts on the cart transport vessel.

Figure 1:
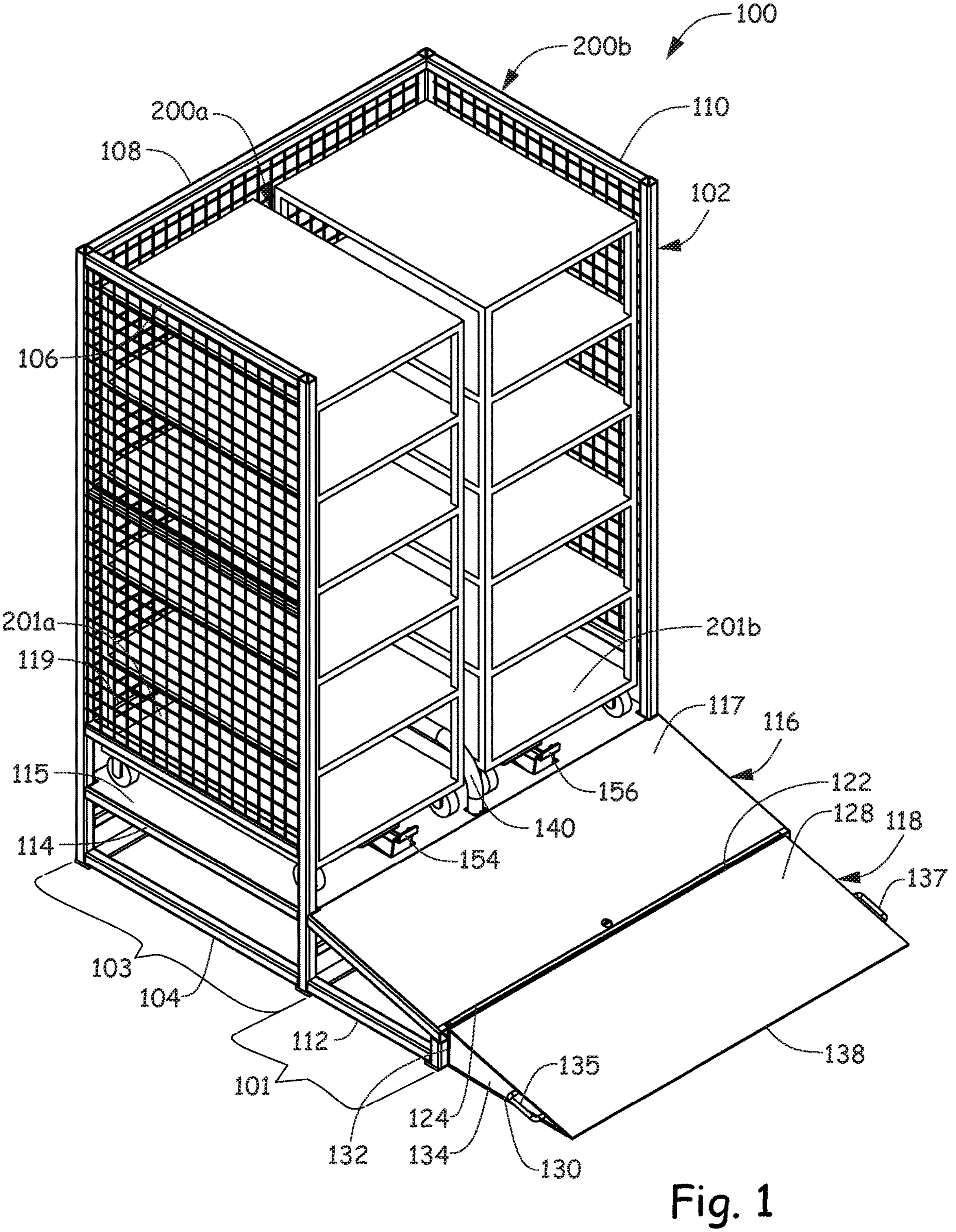
FIG. 1 a front perspective view of a cart transport vessel in an opened configuration.
Figure 2:
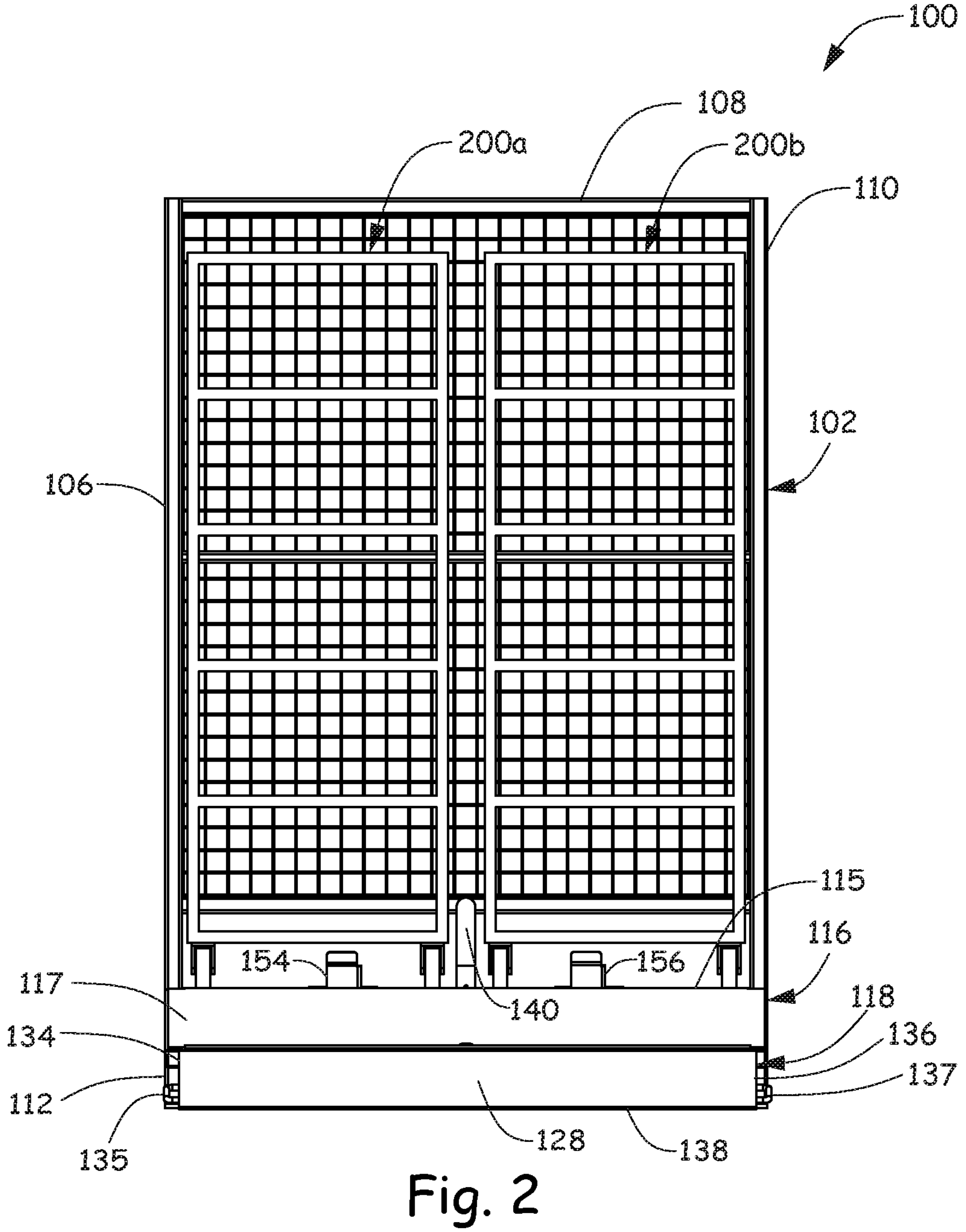
FIG. 2 is a front view of FIG. 1.
Figure 3:
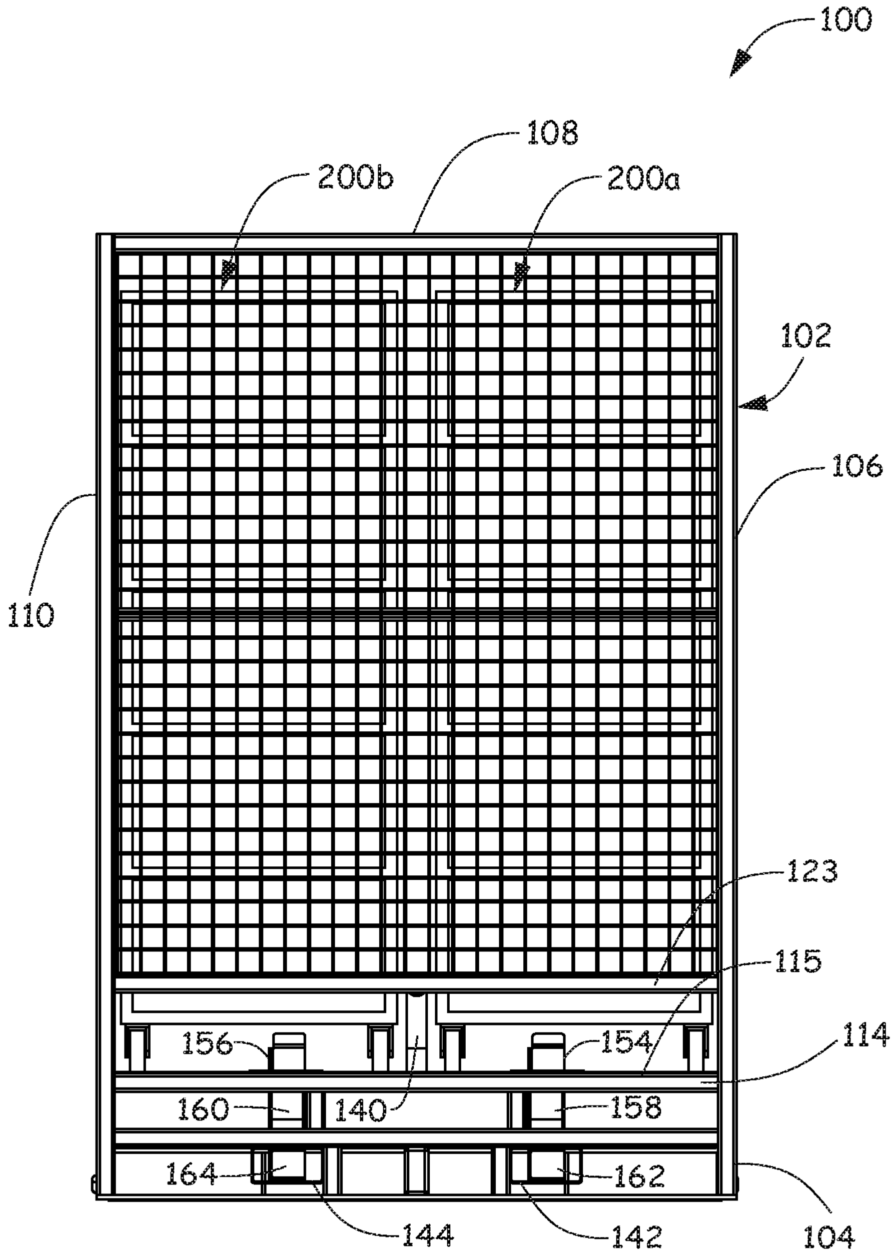
FIG. 3 is a back view of FIG. 1.
Figure 4:
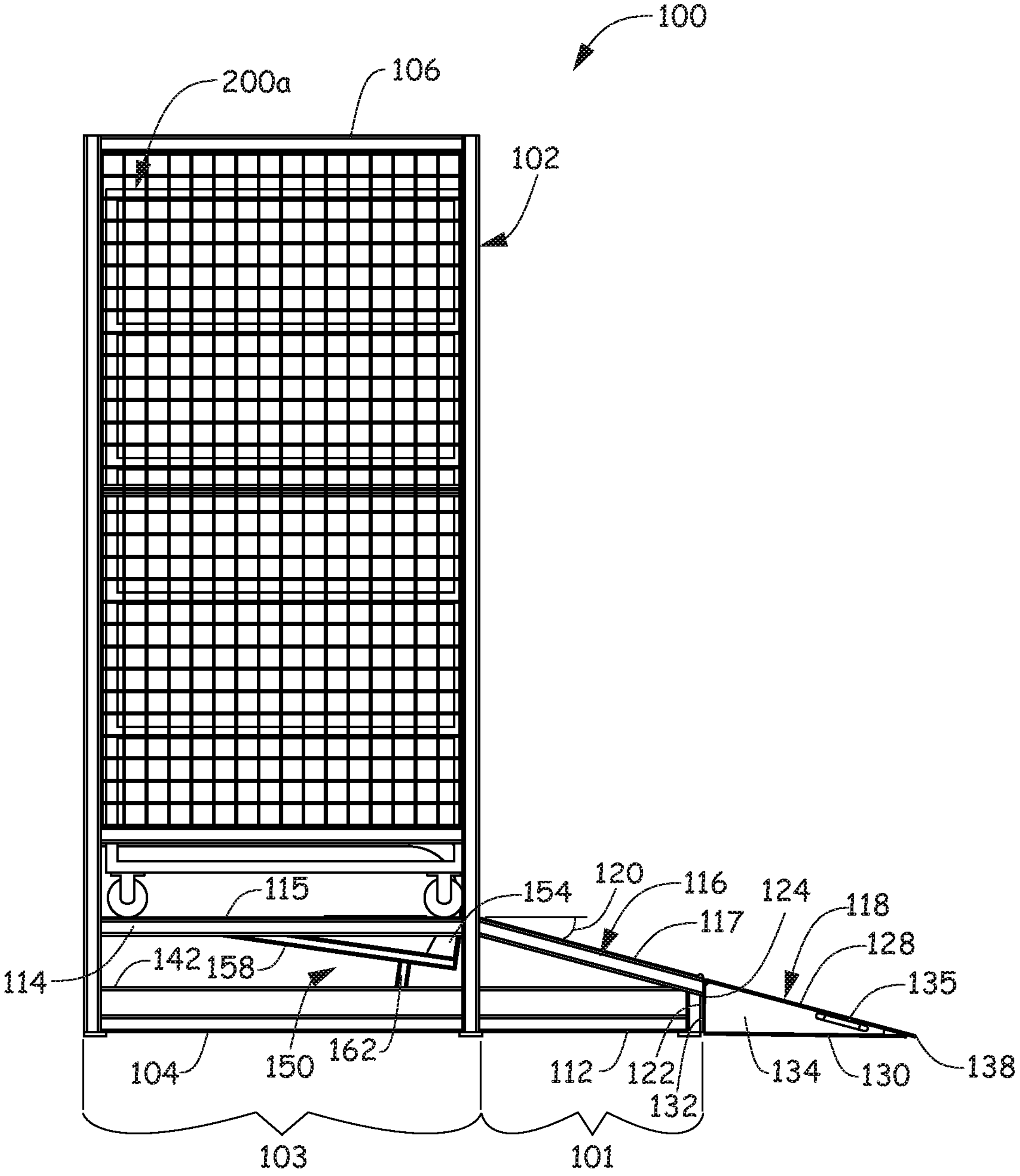
FIG. 4 is a left side view of FIG. 1.
Figure 5:
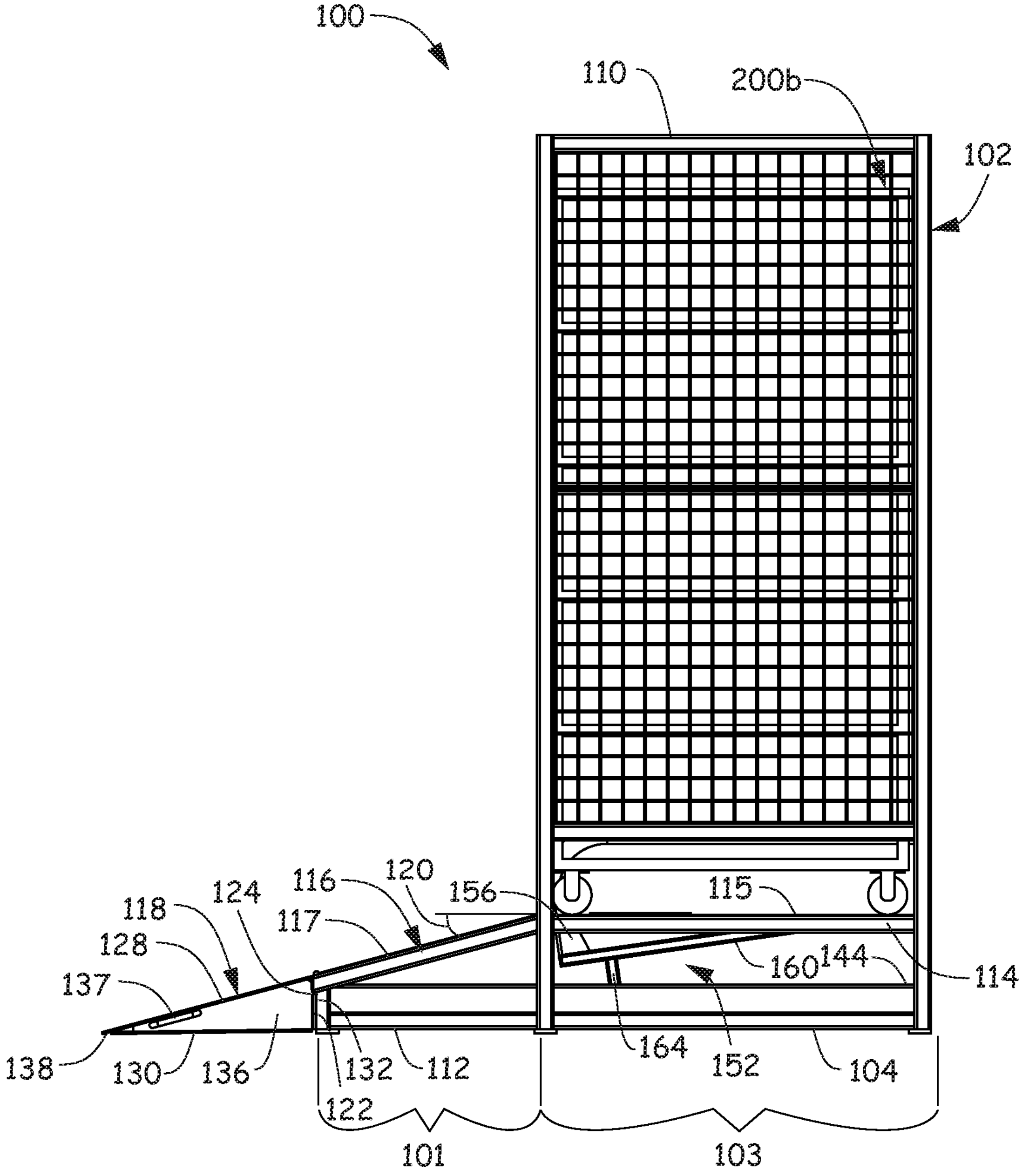
FIG. 5 is a right side view of FIG. 1.
Figure 6:
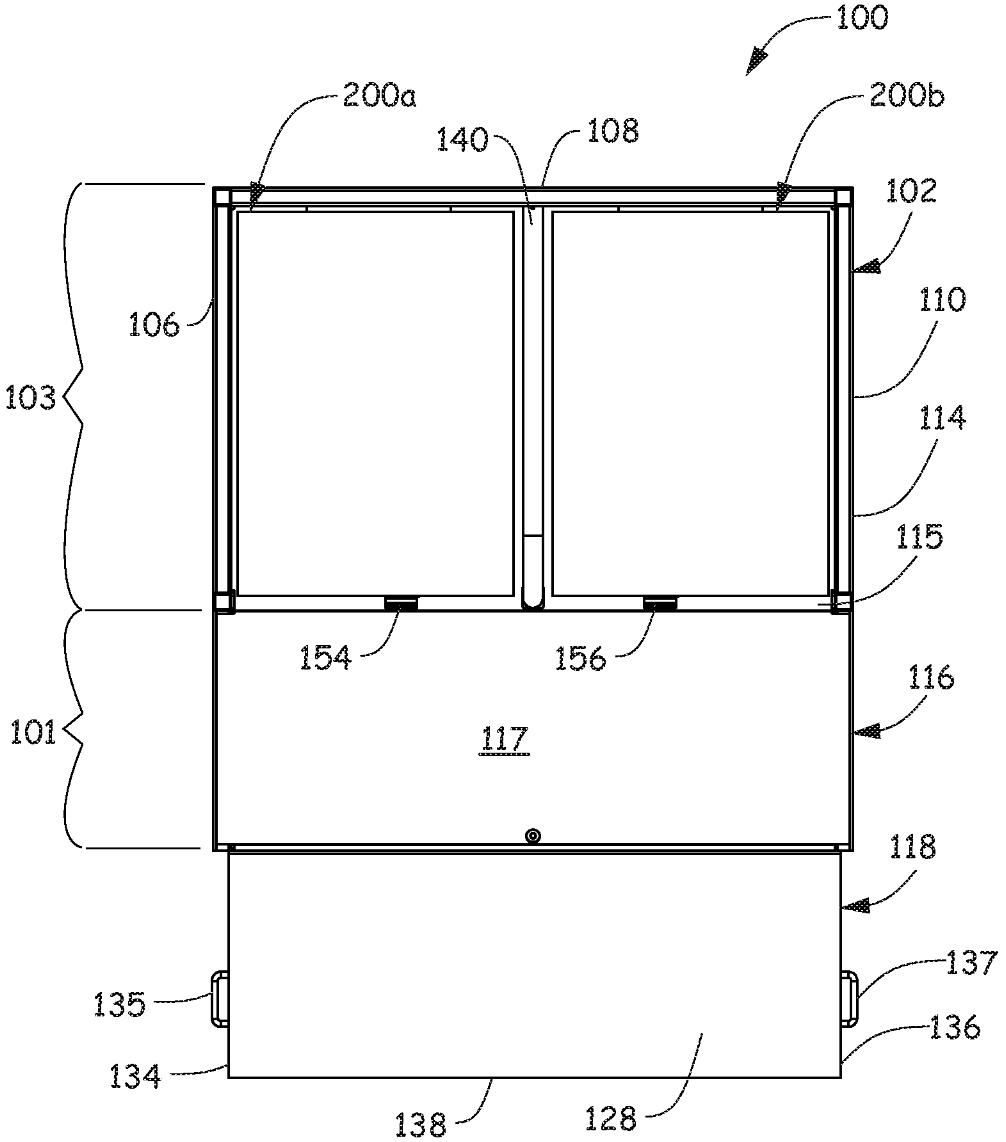
FIG. 6 is a top view of FIG. 1.
Figure 7:
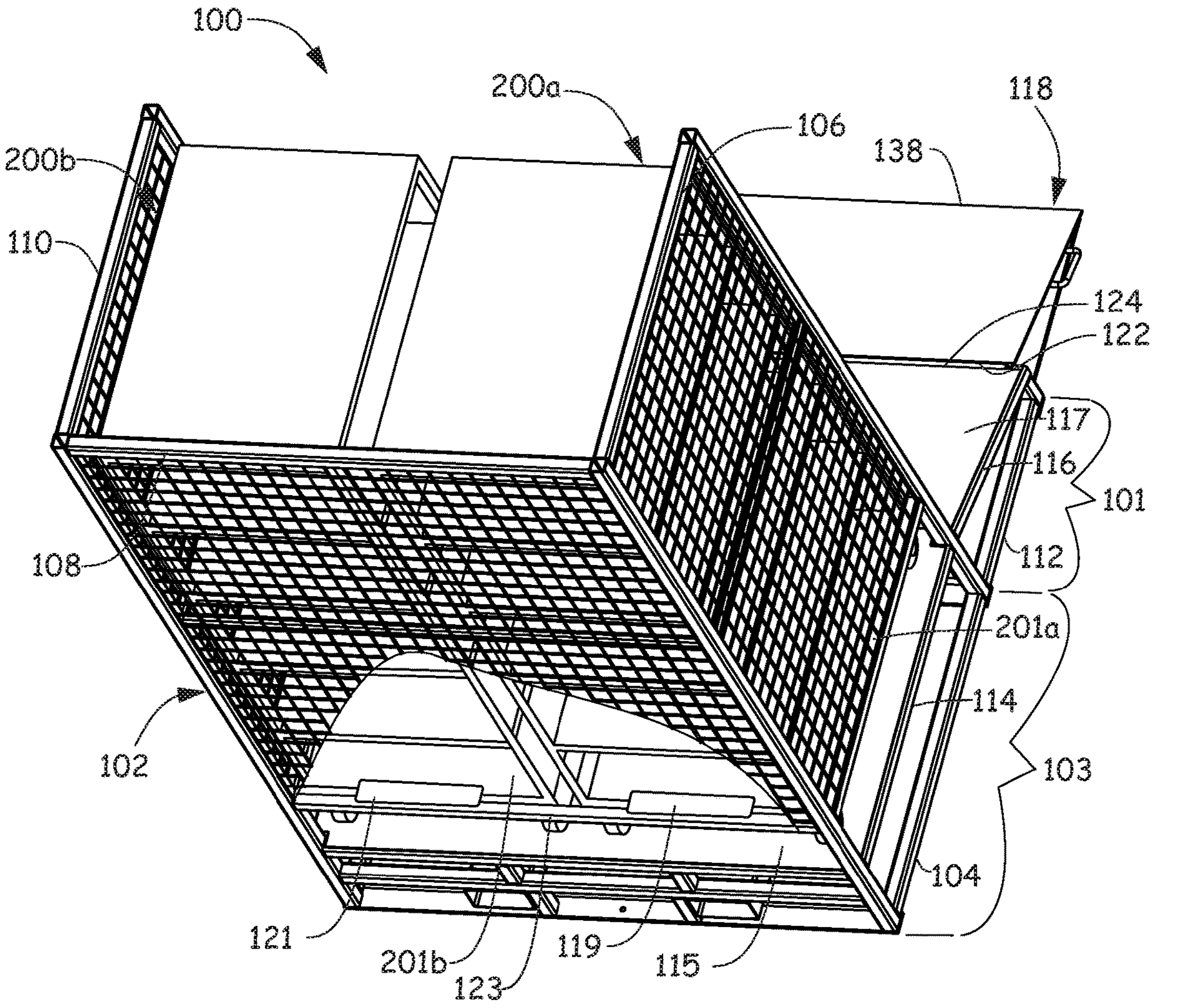
FIG. 7 is a top, rear perspective view of FIG. 1.

FIG. 1 is a front perspective view of a cart transport vessel 100 in an opened configuration. FIG. 2 is a front view, FIG. 3 is a back view, FIG. 4 is a left side view, FIG. 5 is a right side view, FIG. 6 is a top view of FIG. 1 and FIG. 7 is a rear perspective view of FIG. 1. In the opened configuration illustrated in FIGS. 1-7, stocking carts 200*a* and 200*b* may be loaded or unloaded from cart transport vessel 100. As illustrated in FIGS. 1-7, retail stocking carts 200*a* and 200*b* have been loaded onto cart transport vessel 100.

Cart transport vessel 100 comprises a main body 102 having a plurality of frame members that include a ramp section 101 and a cart holding section 103. Cart holding section 103 is defined by a base 104, a left side 106, a back side 108, a right side 110 and a fixed platform 114 having a planar top surface 115. Fixed platform 114 is configured to support or cradle stocking carts 200*a* and 200*b*. Ramp section 101 includes base 112 and a fixed ramp 116. Fixed ramp 116 includes a front end 124, a back end 125 that is adjacent to fixed platform 114 and a planar top surface 117 that is oriented at a downward angle 120 (FIGS. 4 and 5) from planar top surface 115 of fixed platform 114.

Figure 8:
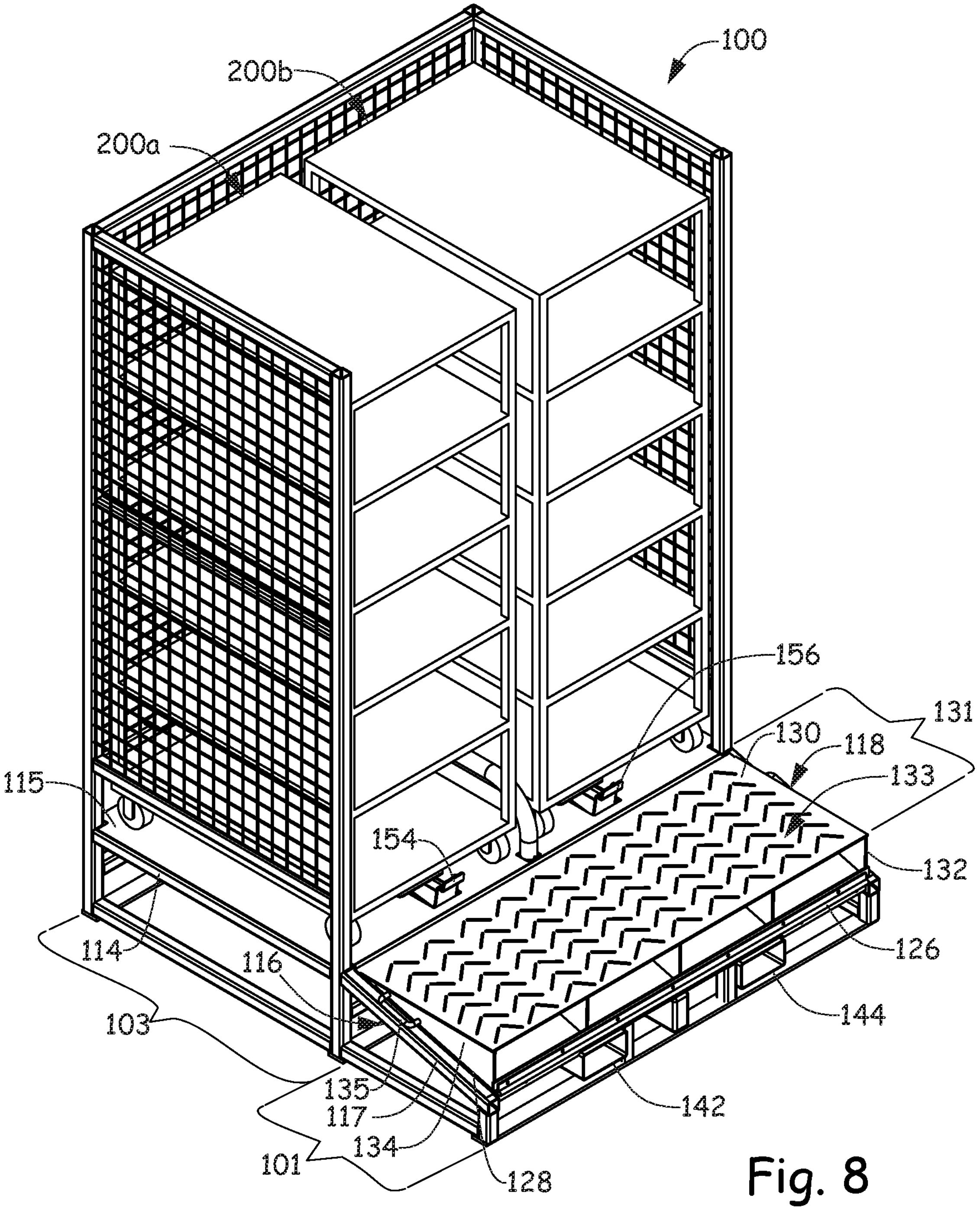
FIG. 8 is a perspective view of a cart transport vessel in a closed configuration.

In addition, cart transport vessel 100 includes a foldable extension 118. A back end 122 of foldable extension 118 is rotatably coupled to front end 124 of fixed ramp 116 by a hinge 126 (FIG. 8). Foldable extension 118 is in the shape of a wedge or triangular prism and has five sides including a first side 128, an opposing second side 130 and a third side 132 that connects first side 128 to opposing second side 130. Second side 130 is approximately at a right angle relative to third side 132 and third side 132 comprises back end 122 of foldable extension 118. In addition, foldable extension 118 includes opposing side ends 134 and 136. Each of side ends 134 and 136 include a respective handle 135 and 137.

When cart transport vessel 110 is in the opened configuration as illustrated in FIGS. 1-7, first side 128 of foldable extension 118 extends from a distal end 138 to back end 122, faces generally upwardly and is in planar alignment with planar top surface 117 of fixed ramp 116. While first side 128 faces generally upwardly, opposing second side 130 in the opened configuration faces generally downwardly at the floor or ground. Third side 132 faces generally backward. Therefore, when stocking carts 200*a* and 200*b* are loaded onto cart transport vessel 110, they are rolled over first side 128 of foldable extension 118 by passing over distal end 138, then moved backwards over back end 122 of foldable extension 118, over front end 124 and planar top surface 117 of fixed ramp 116 and then finally onto planar top surface 115 of fixed platform 114.

Cart transport vessel 100 includes a divider 140. Divider 140 is mounted to planar top surface 115 of fixed platform 114 and is configured to separate stocking cart 200*a* from stocking cart 200*b* when stocking carts 200*a* and 200*b* are loaded onto vessel 100. Cart holding section 103 includes at least one tab or pair of tabs 119 and 121 (FIG. 7) that are located on a frame member of back 108. More specifically, tabs 119 and 121 are located on a frame member 123 that runs along back 108 of cart holding section 103 a spaced distance from planar top surface 115 of fixed platform 114. The distance between the bottom of tabs 119 and 121 and planar top surface 115 are such that a bottom shelf 201*a* and 201*b* (FIG. 7) of each cart 200*a* and 200*b* slides underneath each respective tab 119 and 121. This arrangement ensures that that stocking carts 200*a* and 200*b* do not tip and the carts are held down against planar top surface 115 of fixed platform 114.

Figure 9:
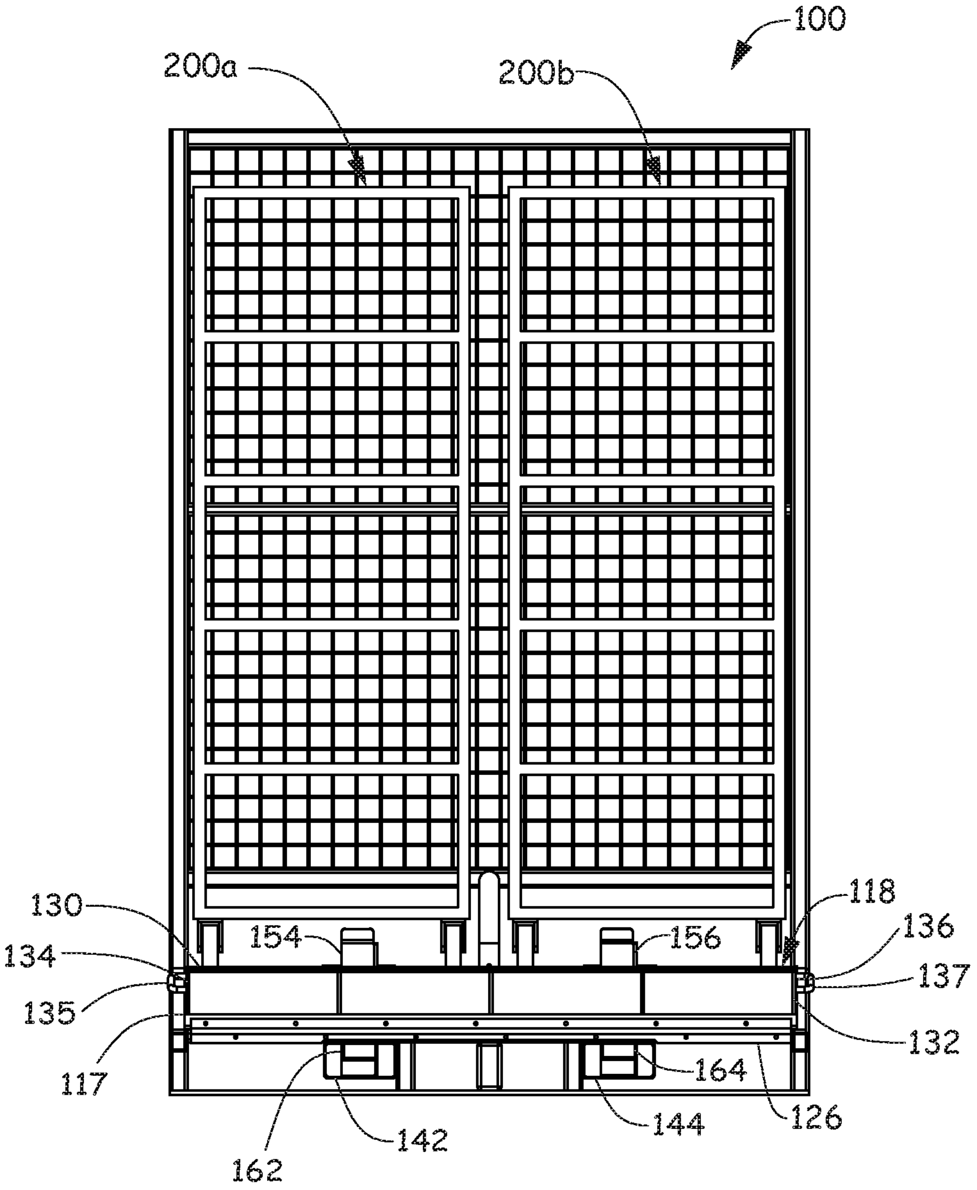
FIG. 9 is a front view of FIG. 8.
Figure 10:
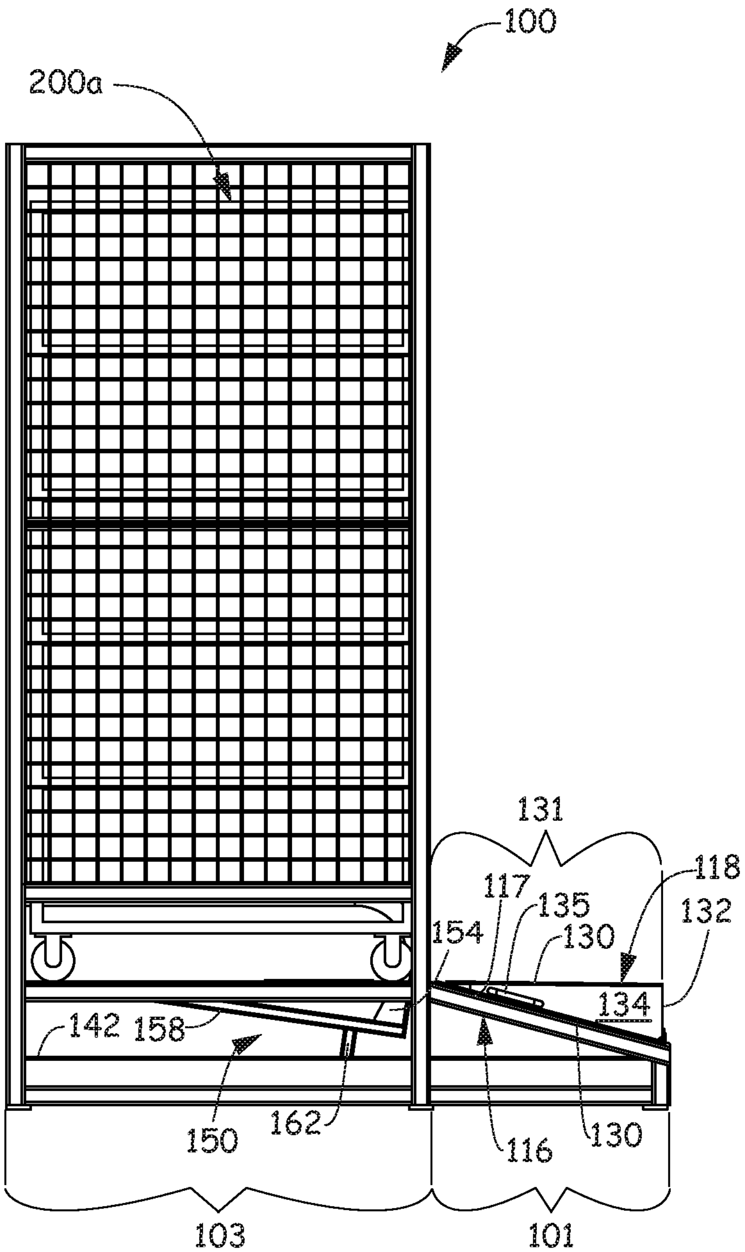
FIG. 10 is a left side view of FIG. 8.
Figure 11:
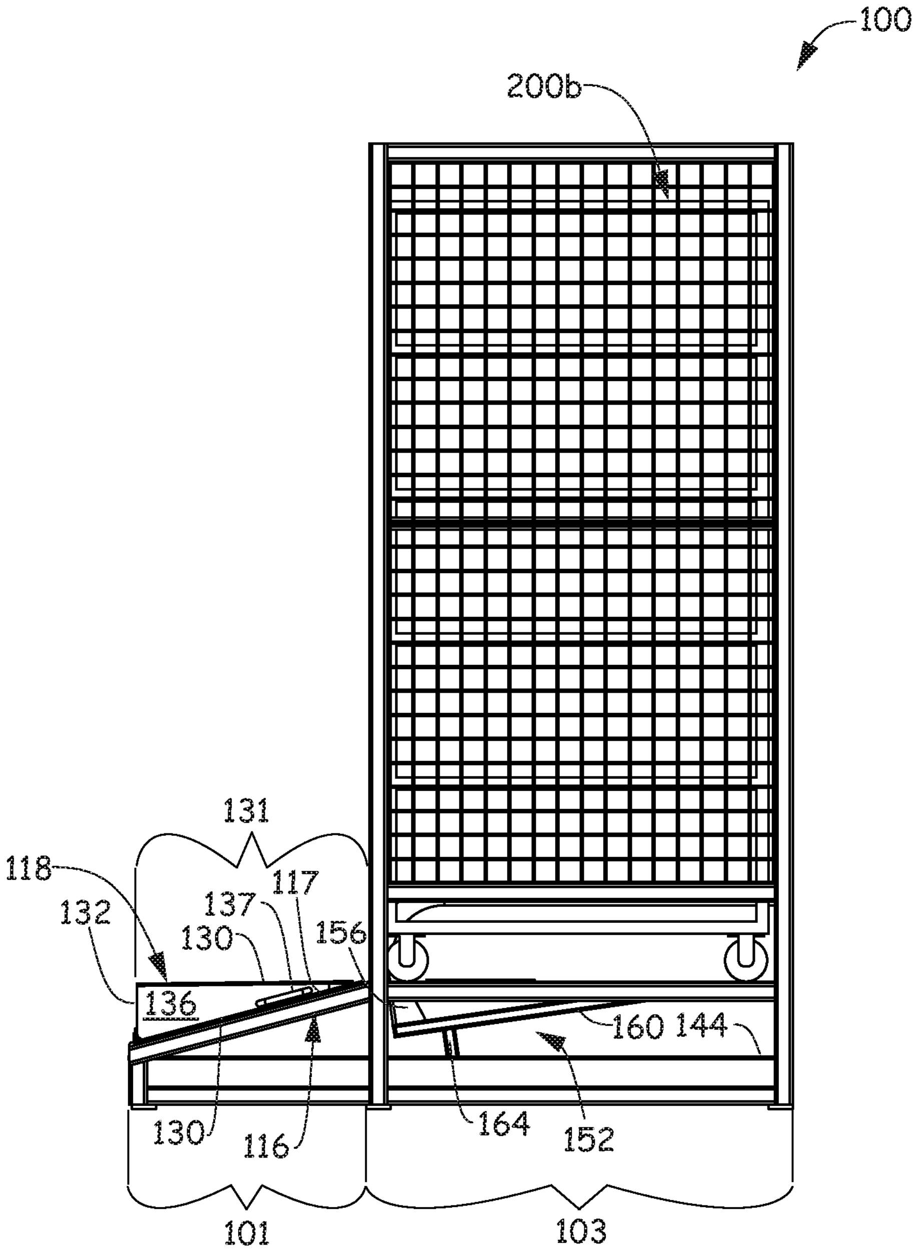
FIG. 11 is a right side view of FIG. 8.
Figure 12:
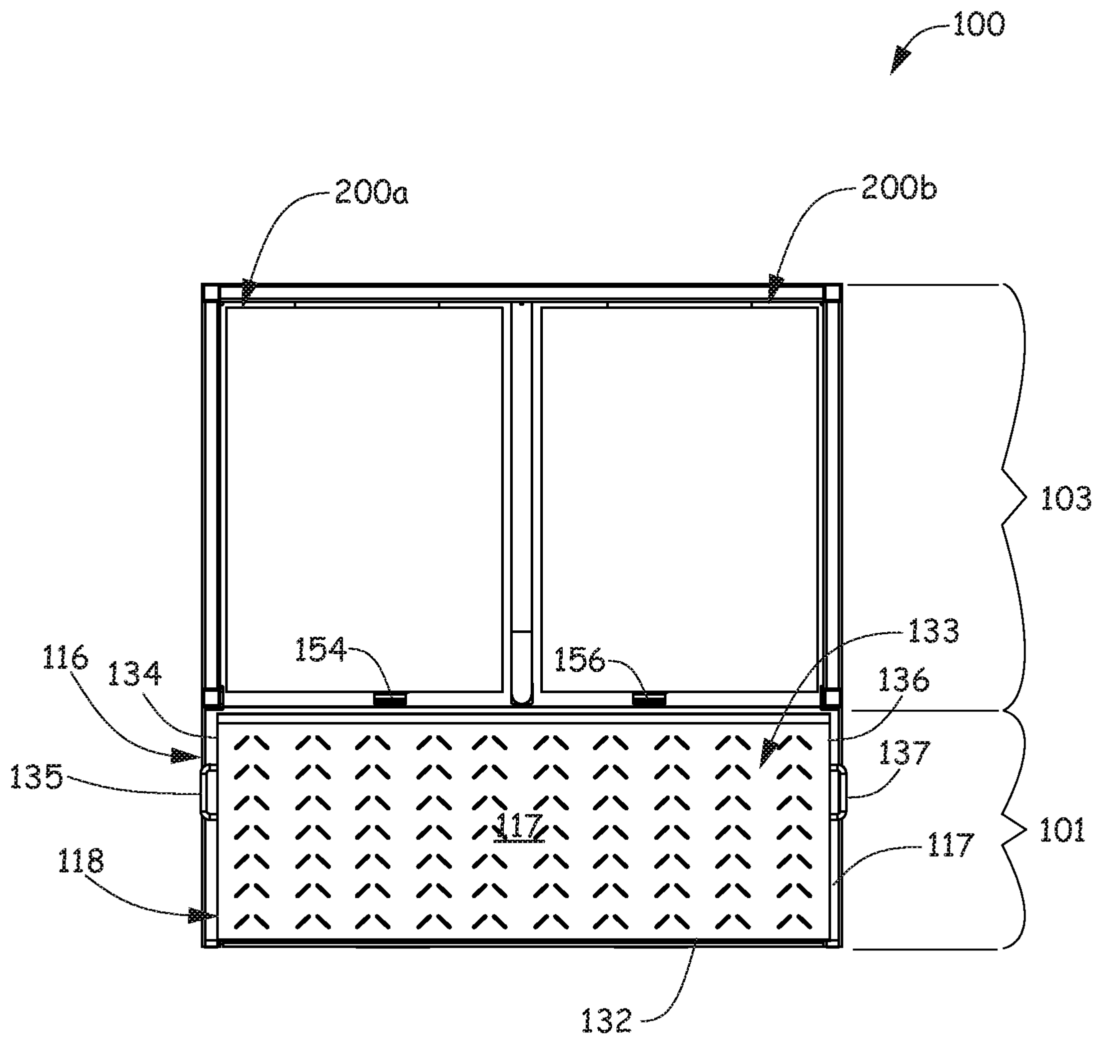
FIG. 12 is a top view of FIG. 8.

FIG. 8 is a perspective view of cart transport vessel 100 in a closed configuration. FIG. 9 is a front view, FIG. 10 is a left side view, FIG. 11 is a right side view and FIG. 12 is a top view of FIG. 8. In the closed configuration illustrated in FIGS. 8-12, stocking carts 200*a* and 200*b* may or may not be loaded on cart transport vessel 100.

In the closed configuration, cart holding section 103 remains in the same configuration as it did while cart transport vessel 100 was in the opened configuration, however, ramp section 101 does not. In the closed configuration, foldable extension 118 is rotated about hinge 126 so that second side 130 of foldable extension 118 is facing generally upwardly, opposing first side 128 is facing generally downwardly and in contact with planar top surface 117 of fixed ramp 116 and third side 132 is facing generally forward. In one embodiment, the rotation of foldable extension 118 about hinge 126 is done manually using handles 135 and 137 on respective side ends 134 and 136. However, it is possible for foldable extension 118 to rotate about hinge 126 using other methods including automatic methods.

Rotating foldable extension 118 about hinge 126 and placing first side 128 against or in contact with planar top surface 117 of fixed ramp 116 provides cart transport vessel 110 with unique functionalities and features. In one embodiment, folding foldable extension 118 reveals one or more forklift slots 142 and 144 at front end of vessel 100. As illustrated in the FIG. 3 back view of vessel 100 and in the FIGS. 4, 5, 10 and 11 side views, one or more forklift slots 142 and 144 are located under fixed platform 114 and fixed ramp 116 and extend from back 108 of fixed platform 114 or cart holding section 103 to front end 124 of fixed ramp 116 or ramp section 101. In another embodiment, second side 130 of foldable extension 118 in the closed configuration is parallel with and in alignment with planar top surface 115 of platform 114. Second side 130 of foldable extension 118, when folded into the closed configuration, provides a flat operator workspace area 131 including a horizontal surface that is parallel with the ground and configured to be stood on by an operator to pick and place retails goods into and out of stocking carts 200*a* and 200*b* that are positioned in cart holding section 103. As illustrated in FIGS. 8-12 second side 130 of foldable extension 118 includes a plurality of raised surfaces 133 to provide traction for an operator standing in the operator workspace area in one embodiment.

Figure 13:
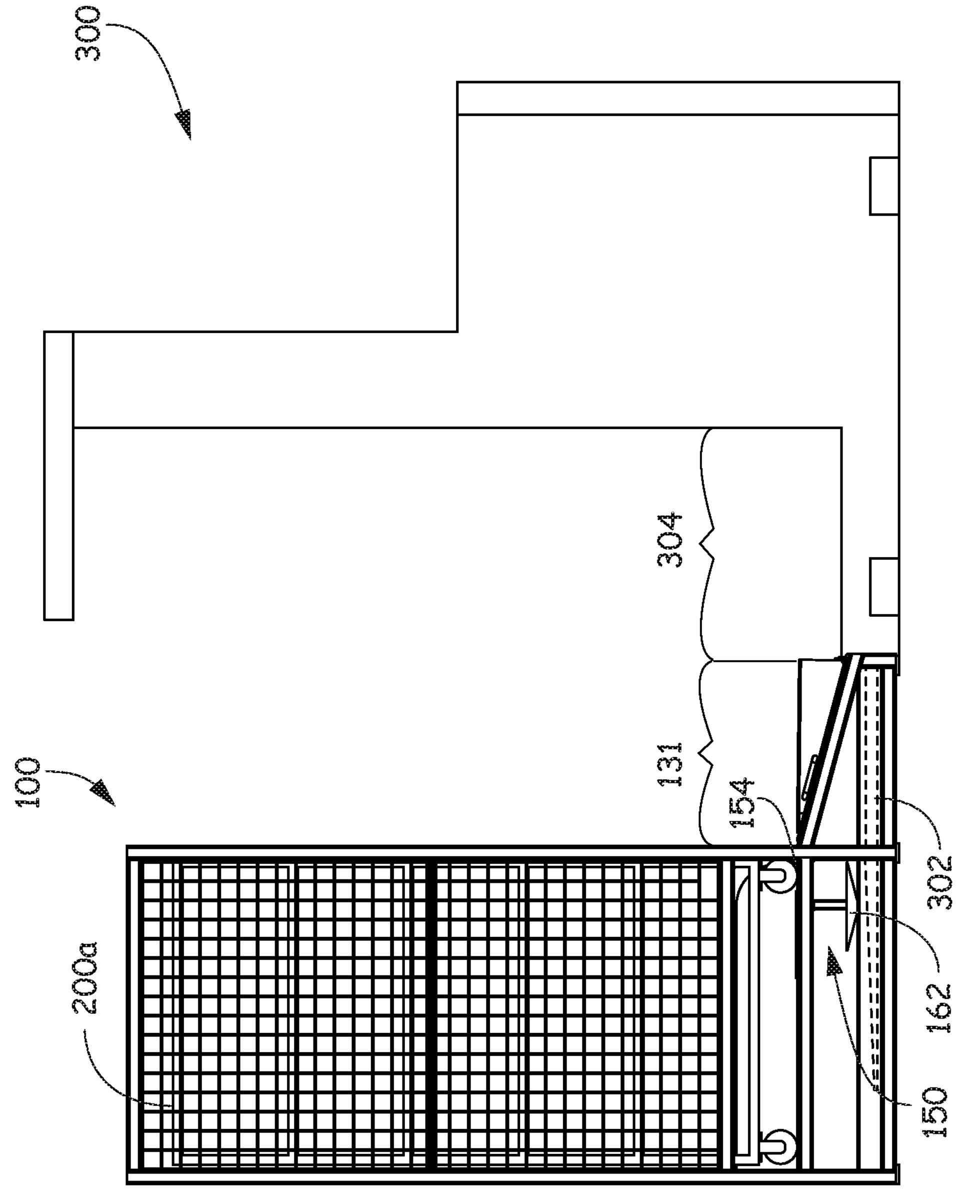
FIG. 13 is a left side view of a work machine engaged with the cart transport vessel so that the cart transport vessel is in a locked configuration.
Figure 14:
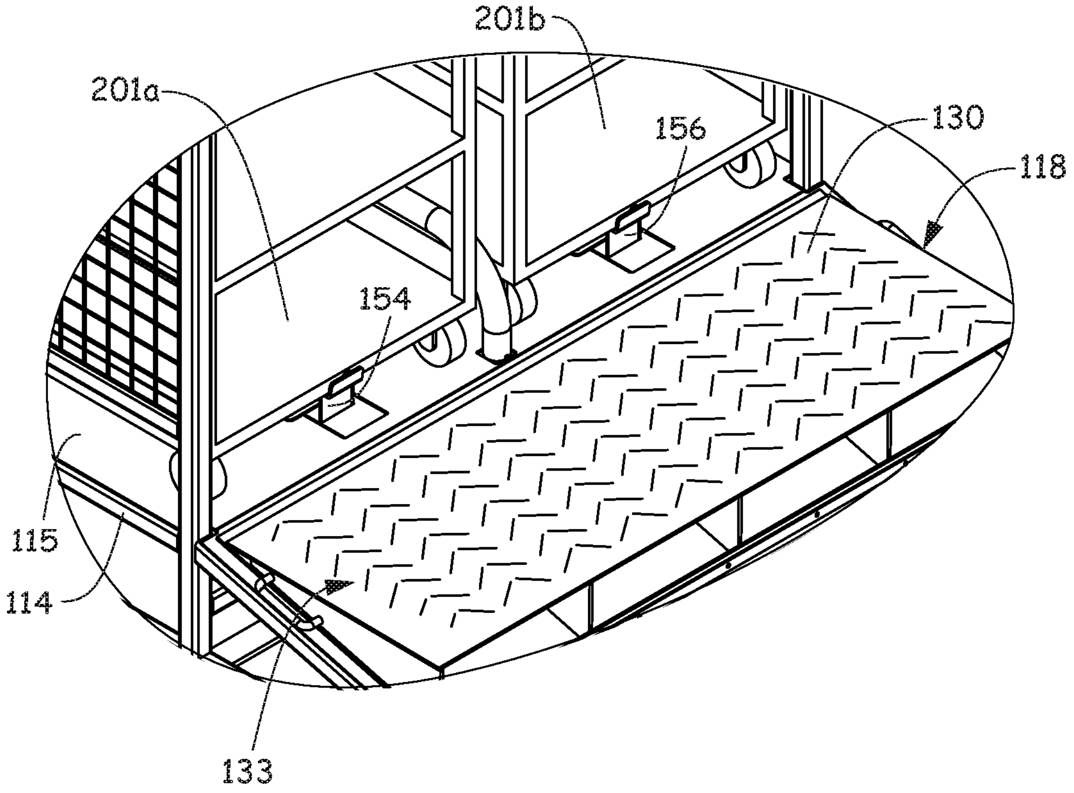
FIG. 14 is an enlarged perspective view of a portion of the cart transport vessel in the locked configuration.

FIG. 13 is a side view of a work machine or order picker 300 engaged with one or more forklift slots 142 and 144 of cart transport vessel 100 so as to place the closed configuration of cart transport vessel 100 into a locked configuration. FIG. 14 is an enlarged perspective view of a portion of the closed configuration of cart transport vessel 100 in the locked configuration. While FIG. 13 illustrates work machine 300 engaged with one or more forklift slots 142 and 144 from a front end of vessel 100, it should be realized that it is also possible for work machine 300 to engage with the one or more forklift slots 142 and 144 from a back end of vessel 100. When work machine 300 is engaged with the front of vessel 100, vessel 100 is in a closed configuration. When work machine 300 is engaged with the back of vessel 100, vessel 100 may be in the closed or opened configurations. In either instance, when work machine 300 engages its one or more forks 302 with one or more forklift slots 142 and 144, work machine 300 configures cart transport vessel 100 into a locked configuration. In other words, when work machine 300 engages with cart transport vessel 100, one or more locking mechanisms 150 and 152 confine stocking carts 200*a* and 200*b* to fixed platform 114 of cart holding section 103.

In particular, each of locking mechanisms 150 and 152 include respective lock bars 154 and 156, respective arm members 158 and 160 and respective guide members 162 and 164. In regards to locking mechanism 150, lock bar 154 protrudes through an aperture in planar top surface 115 of fixed platform 114 and is coupled to arm member 158 located under fixed platform 114. Arm member 158 is coupled to guide member 162 that depends downwardly from arm member 158 and, when cart transport vessel 100 is in an opened or closed configuration, into slot 142 that is configured to receive a fork of a work machine. In regards to locking mechanism 152, lock bar 156 protrudes through an aperture in planar top surface 115 of fixed platform 114 and is coupled to arm member 160 located under fixed platform 114. Arm member 160 is coupled to guide member 164 that depends downwardly from arm member 160 and, when vessel 100 is in an opened or closed configuration, into slot 144 that is configured to receive a fork of a work machine. In the opened or closed configurations, guide members 162 and 164 in unactuated positions protrude into respective forklift slots 142 and 144 through an opening in the top of respective forklift slots 142 and 144.

Both the apertures and the lock bars 154 and 156 that protrude through the apertures are located proximate a front of fixed platform 114 and therefore also in front of stocking carts 200*a* and 200*b* after they are loaded onto fixed platform 114. In the opened configuration and in the closed configuration, lock bars 154 and 156 protrude a distance from planar top surface 115 that is less than a height of the underside of bottom shelves 201*a* and 201*b* on retail stocking carts 200*a* and 200*b*. In this way, lock bars 154 and 156 in the opened configuration and the closed configuration do not interfere with the placement of retail stocking carts 200*a* and 200*b* on fixed platform 114.

In the locked configuration illustrated in FIGS. 13 and 14, forks from work machine 300 are received by slots 142 and 144 and when received, actuate guide members 162 and 164 into actuated positions so that arm members 158 and 160 push lock bars 154 and 156 upwards through their respective apertures in planar top surface 115 of fixed platform 114. As illustrated in FIG. 14, distal ends of lock bars 154 and 156 respectively engage with bottom shelves 201*a* and 201*b* of stocking carts 200*a* and 200*b* and therefore secure stocking carts 200*a* and 200*b* in place on fixed platform 114. Guide members 162 and 164 return to unactuated positions upon removal of forks from respective forklift slots 142 and 144.

In the embodiment of the locked configuration illustrated in FIG. 13, an operator can stand in operator area 304 of work machine 300 to operate the work machine. In one embodiment, work machine 300 is operated to insert forks into forklift slots 142 and 144. In another embodiment, work machine 300 is operated to move cart transport vessel 100 around a warehouse floor. In yet another embodiment, work machine 300 is operated to raise cart transport vessel 100 into the air. In any of these embodiments, the operator can move from operator area 304 of work machine 300 onto operator work space 131 of vessel 100 to pick and place retails goods into and out of stocking carts 200*a* and 200*b* that are locked in cart holding section 103.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A cart transport vessel comprising:

a cart holding section configured to hold at least one cart and defined by a right side, a left side, a front, a back and a fixed platform having a horizontally oriented planar top surface, wherein the front includes an opening that is at least as great as a width of the at least one cart;

a fixed ramp section including a front end, a back end that is adjacent to and fixed to the front of the cart holding section and a planar top surface that is at least as wide as the opening of the front of the cart holding section, wherein the planar top surface of the fixed ramp is oriented at a downward angle from the horizontally oriented planar top surface of the fixed platform;

a foldable ramp extension rotatably coupled to the front end of the fixed ramp, the foldable ramp extension including a first planar surface, an opposing second planar surface, a proximal side that connects the first planar surface to the opposing bottom side, a distal end where the first planar surface and the opposing second planar surface intersect, a right side and a left side, wherein the first planar surface and the opposing second planar surface of the foldable ramp extension extend between the right and left sides of the foldable ramp extension and between the proximal side and the distal end of the foldable ramp extension and have widths that are at least as great as the opening of the cart holding section, wherein the second planar surface of the foldable ramp extension includes a plurality of raised surfaces that protrude from the second planar surface of the foldable ramp extension to provide for operator traction;

wherein when the cart transport vessel is in an opened configuration the first planar surface of the foldable ramp extension faces upwardly and is in planar alignment with the planar top surface of the fixed ramp and the opposing second planar surface faces downwardly at a floor;

wherein when the cart transport vessel is in a closed configuration the first planar surface of the foldable ramp extension faces downwardly and in contact with the planar top surface of the fixed ramp and the opposing second planar surface faces upwardly to provide a flat operator workspace area that is in planar alignment with the horizontally oriented planar surface of the cart holding section and located outside of and adjacent to the cart holding section and configured to be stood on by an operator.

2. The cart transport vessel of claim 1, further comprising a pair of forklift slots located under the fixed platform and the fixed ramp and extending from the back of the cart holding section to the front of the ramp section.

3. The cart transport vessel of claim 1, further comprising at least one locking mechanism that is configured to actuate when at least one fork from a work machine is inserted into a forklift slot of the cart transport vessel to put the cart transport vessel into a locked configuration.

4. The cart transport vessel of claim 3, wherein the at least one locking mechanism comprises a lock bar that extends through an aperture in the fixed platform and is actuated to move upwardly from the fixed platform to engage a distal end of the lock bar with a bottom shelf of the at least one cart that is located in the cart holding section.

5. The cart transport vessel of claim 4, wherein the at least one locking mechanism comprises a guide member that in an unactuated position protrudes into the forklift slot of the cart transport vessel through an opening in a top of the forklift slot and is moveable to an actuated position upon insertion of the fork into the forklift slot, wherein in the actuated position the guide member moves the lock bar to engage with the bottom shelf of the at least one cart that is located in the cart holding section.

6. The cart transport vessel of claim 5, wherein the guide member returns to an unactuated position upon removal of the fork from the forklift slot.

7. The cart transport vessel of claim 1, further comprising at least one tab that extends from the back of the cart holding section a spaced distance from the planar top surface of the fixed platform, the spaced distance between the at least one tab and the planar top surface of the fixed platform are such that a bottom shelf of the at least one cart slides underneath the tab to ensure that the cart does not tip and is held down against the planar top surface of the fixed platform.

8. A cart transport vessel comprising:

a fixed platform configured to hold at least one cart;

a fixed ramp located adjacent to the fixed platform; and a foldable ramp extension that is rotatably coupled to a front end of the fixed ramp, wherein in an opened configuration a first side of the foldable ramp extension faces upwardly and is in planar alignment with a planar top surface of the fixed ramp and an opposing second side of the foldable extension faces downwardly and wherein in a closed configuration the foldable ramp extension is rotated so that the first side of the foldable ramp extension faces downwardly and is in contact with the planar top surface of the ramp section and the opposing second side of the foldable ramp extension faces upwardly to provide a flat operator workspace area that is configured to be stood on by an operator; and at least one locking mechanism that is configured to secure the at least one cart onto the fixed platform into a locked configuration, wherein at least one forklift slot located below the fixed platform and the fixed ramp is configured to receive at least one fork of a work machine that is configured to actuate the at least one locking mechanism to secure the at least one cart.

9. The cart transport vessel of claim 8, wherein the planar top surface of the fixed ramp is oriented at a downward angle from a planar top surface of the fixed platform.

10. The cart transport vessel of claim 9, wherein the at least one locking mechanism comprises a guide member, an arm member coupled to the guide member and a lock bar coupled to the arm member, wherein the guide member in an unactuated position protrudes into the at least one forklift slot of the cart transport vessel through an opening in a top of the forklift slot and is moveable to an actuated position upon insertion of the at least one fork into the forklift slot, wherein in the actuated position the guide member moves the arm member and the arm member moves the lock bar to engage with a bottom shelf of the at least one cart that is located on the fixed platform.

11. The cart transport vessel of claim 10, wherein the guide member returns to an unactuated position upon removal of the at least one fork from the at least one forklift slot.

12. The cart transport vessel of claim 8, wherein the fixed platform and a plurality of frame members define a cart holding section that includes a right side, a left side, a front and a back.

13. The cart transport vessel of claim 12, further comprising at least one tab that extends from the back of the cart holding section a spaced distance from the planar top surface of the fixed platform, the spaced distance between the tab and the planar top surface of the fixed platform are such that a bottom shelf of the at least one cart slides underneath the tab to ensure that the cart does not tip and is held down against the planar top surface of the fixed platform.

14. A method of transporting carts in a warehouse comprises:

loading at least one cart onto a cart transport vessel in an opened configuration by rolling the cart over a first side of a foldable extension, rolling the cart over a planar top surface of a fixed ramp and placing the cart on a planar top surface of a fixed platform, wherein the foldable extension is rotatably coupled to a front end of the fixed ramp and the fixed platform is coupled to a back end of the fixed ramp;

placing the cart transport vessel into a closed configuration by rotating the foldable extension so that the first side is in contact with the planar top surface of the fixed ramp and an opposing second side of the foldable extension faces upwardly to provide a flat operator workspace area that is configured to be stood on by an operator; and inserting at least one fork of a work machine into at least one forklift receiving slot located below the fixed ramp and the fixed platform of the cart transport vessel to move the cart transport vessel and therefore the at least one cart, wherein inserting the at least one fork of the work machine actuates a locking mechanism that is configured to secure the at least one cart onto the fixed platform into a locked configuration.

15. The method of claim 14, wherein, the locking mechanism includes a lock bar that extends through an aperture in the fixed platform.

16. The method of claim 15, wherein actuating the locking mechanism comprises moving the lock bar upwardly relative to the fixed platform to engage a distal end of the lock bar with a bottom shelf of the at least one cart that is located on the planar top surface of the fixed platform.

17. The method of claim 14, further comprising lifting the cart transport vessel into the air to load or unload items from the at least one cart after the cart transport vessel is placed in a locked configuration.

* * * * *